United States Patent [19]
Case

[11] Patent Number: 6,061,923
[45] Date of Patent: May 16, 2000

[54] WALL-MOUNTED EXTENDABLE HAIR DRYER HOLDER

[76] Inventor: Agnes G. Case, 5 F Wood Creek Dr., Rome, N.Y. 13440

[21] Appl. No.: 09/204,451

[22] Filed: Dec. 3, 1998

[51] Int. Cl.$^7$ .................................................. E04G 3/00
[52] U.S. Cl. .............................. 34/90; 34/97; 248/277.1
[58] Field of Search ................... 34/96, 97, 98, 34/90, 91, 202, 283; 248/277.1, 276.1; 392/380

[56] References Cited

U.S. PATENT DOCUMENTS

| | | | |
|---|---|---|---|
| 2,013,882 | 9/1935 | Francis | 248/277 |
| 3,168,791 | 2/1965 | Nutting | 248/188.1 |
| 3,278,247 | 10/1966 | Tisdell | 312/209 |
| 5,313,716 | 5/1994 | Wolfe | 34/96 |
| 5,761,825 | 6/1998 | Ammon et al. | 34/91 |
| 5,842,670 | 12/1998 | Nigoghosian | 34/90 |

*Primary Examiner*—Denise L. Ferensic
*Assistant Examiner*—Michelle A. Mattera

[57] ABSTRACT

A hair dryer holder for holding a hair dryer so that a user's hands are free to perform other acts. The hair dryer holder includes a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

12 Claims, 3 Drawing Sheets

WALL-MOUNTED EXTENDABLE HAIR DRYER HOLDER

BACKGROUND OF THE INVENTION

1. Field of the Invention

The present invention relates to hair dryer holders and more particularly pertains to a new hair dryer holder for holding a hair dryer so that a user's hands are free to perform other acts.

2. Description of the Prior Art

The use of hair dryer holders is known in the prior art. More specifically, hair dryer holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,225,106 by Eplan; U.S. Pat. No. 5,350,144 by Lary; U.S. Pat. No. Des. 342,343 by Slivko; U.S. Pat. No. 5,172,880 by McDougall; U.S. Pat. No. 4,874,142 by Gelatt; and U.S. Pat. No. 5,064,154 by Payne.

While these devices fulfill their respective, particular objectives and requirements, the aforementioned patents do not disclose a new hair dryer holder. The inventive device includes a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

In these respects, the hair dryer holder according to the present invention substantially departs from the conventional concepts and designs of the prior art, and in so doing provides an apparatus primarily developed for the purpose of holding a hair dryer so that a user's hands are free to perform other acts.

SUMMARY OF THE INVENTION

In view of the foregoing disadvantages inherent in the known types of hair dryer holders now present in the prior art, the present invention provides a new hair dryer holder construction wherein the same can be utilized for holding a hair dryer so that a user's hands are free to perform other acts.

The general purpose of the present invention, which will be described subsequently in greater detail, is to provide a new hair dryer holder apparatus and method which has many of the advantages of the hair dryer holders mentioned heretofore and many novel features that result in a new hair dryer holder which is not anticipated, rendered obvious, suggested, or even implied by any of the prior art hair dryer holders, either alone or in any combination thereof.

To attain this, the present invention generally comprises a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hair dryer holder apparatus and method which has many of the advantages of the hair dryer holders mentioned heretofore and many novel features that result in a new hair dryer holder which is not anticipated, rendered obvious, suggested, or even implied by any of the prior art hair dryer holders, either alone or in any combination thereof.

It is another object of the present invention to provide a new hair dryer holder which may be easily and efficiently manufactured and marketed.

It is a further object of the present invention to provide a new hair dryer holder which is of a durable and reliable construction.

An even further object of the present invention is to provide a new hair dryer holder which is susceptible of a low cost of manufacture with regard to both materials and labor, and which accordingly is then susceptible of low prices of sale to the consuming public, thereby making such hair dryer holder economically available to the buying public.

Still yet another object of the present invention is to provide a new hair dryer holder which provides in the apparatuses and methods of the prior art some of the advantages thereof, while simultaneously overcoming some of the disadvantages normally associated therewith.

Still another object of the present invention is to provide a new hair dryer holder for holding a hair dryer so that a user's hands are free to perform other acts.

Yet another object of the present invention is to provide a new hair dryer holder which includes a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

Still yet another object of the present invention is to provide a new hair dryer holder that is mountable to a wall structure to hold a hair dryer to the wall structure.

Even still another object of the present invention is to provide a new hair dryer holder that has an adjustably extendable arm for permitting extension and retraction of the hair dryer to and from the wall structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
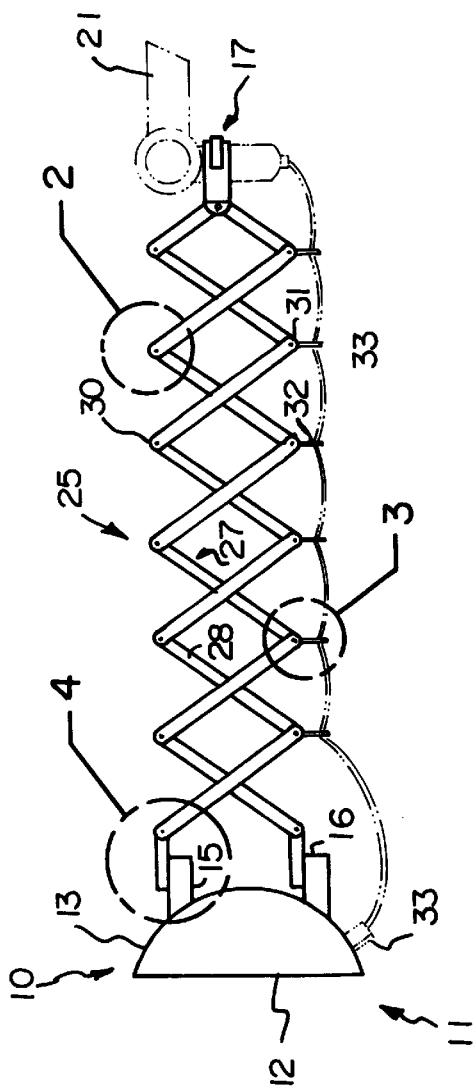
FIG. 1 is a schematic side view of a new hair dryer holder in use in an extended position according to the present invention.

With reference now to the drawings, and in particular to FIGS. 1 through 6 thereof, a new hair dryer holder embodying the principles and concepts of the present invention and generally designated by the reference numeral 10 will be described.

As best illustrated in FIGS. 1 through 6, the hair dryer holder 10 generally comprises a base and a generally U-shaped holding bracket adapted for holding a hair dryer. An adjustably extendable extension member connects the base to the holding bracket. The extension member has an extended position and a retracted position. The holding bracket and the base is positioned closer together when the extension member is positioned in the retracted position than when the extension member is positioned in the extended position.

In closer detail, the hair dryer holder 10 comprises a generally hemispherical base 11 having a substantially planar and generally circular rear face 12 and a rounded generally hemispherical front face 13 with a convexity facing outwardly away from the rear face of the base.

The rear face of the base is designed for mounting to a wall structure. Preferably, the rear face of the base has a spaced apart pair of key-hole shaped mounting holes 14 therein preferably positioned at generally diametric positions along the circular outer periphery of the rear face. In use, the mounting holes of the rear face are designed for receiving mounting fasteners outwardly extending from the wall structure to mount the rear face of the base to the wall structure. In an ideal illustrative embodiment, the rear face of the base has an outer diameter of about 8 inches.

The front face of the base has spaced apart upper and lower mounting arms 15,16 outwardly extending therefrom. Preferably, the lengths of the mounting arms defined outwardly from the front face of the base are substantially equal to one another.

Figure 5:
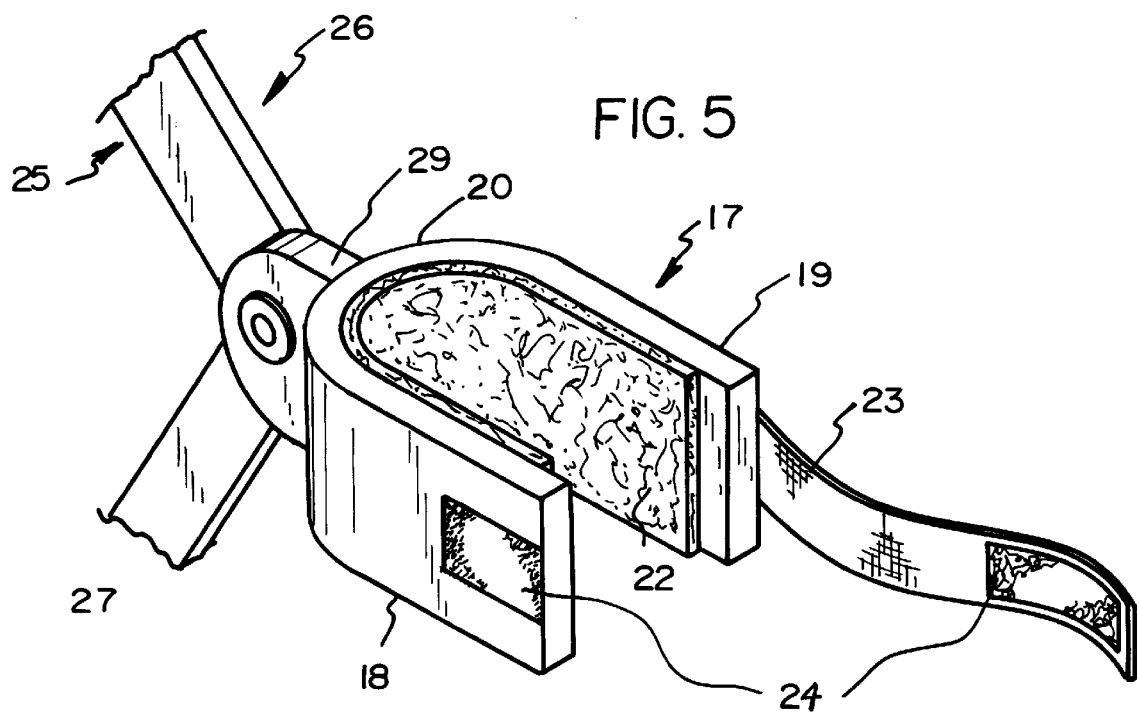
FIG. 5 is a schematic enlarged perspective view of the holding bracket of the present invention.
Figure 6:
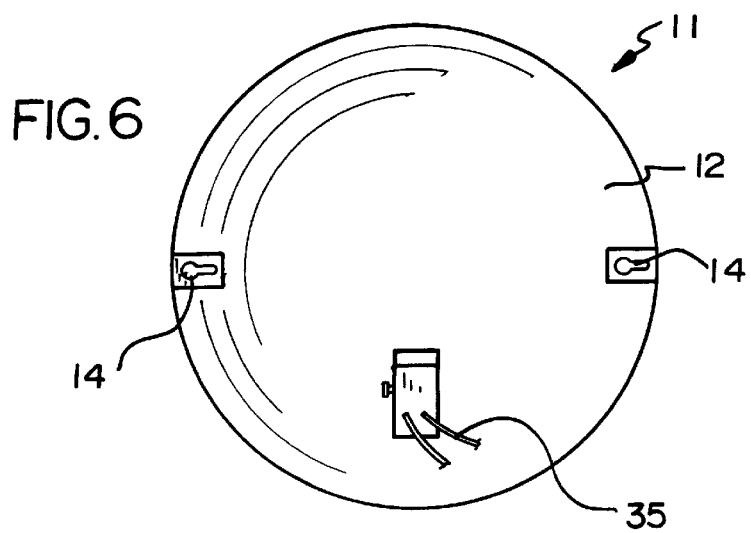
FIG. 6 is a schematic rear view of the base of the present invention.

With reference to FIG. 5, a generally U-shaped holding bracket 17 is provided having a spaced apart pair of generally straight and preferably resiliently deflectable side portions 18,19 and an arcuate middle portion 20 connecting the side portions of the holding bracket together. The holding bracket has a generally U-shaped interior face defining a generally U-shaped space designed for receiving a hand-held gun style hair dryer 21 therein. In use, the side portions of the holding bracket are preferably designed for pinching the hair dryer therebetween. Ideally, the interior face of the holding bracket has a generally U-shaped resiliently deformable pad 22 thereon designed for helping hold the hair dryer in the U-shaped space of the holding bracket.

Each of the side portions of the holding bracket terminates at a free end distal the middle portion of the holding bracket. A flexible strap 23 is extended between the free ends of the side portions of the holding bracket to help hold the hair dryer between the side portions of the holding bracket. The flexible strap has a pair of opposite ends with one of the ends of the flexible strap coupled to one of the side portions of the holding bracket and the other end of the flexible strap detachably attached to the other of the side portions of the holding bracket preferably by a hook and loop fastener 24.

With reference to FIG. 1, an adjustably extendable and retractable extension member 25 connects the base to the holding bracket. In use, the extension member is positionable between an extended position and a retracted position. The holding bracket and the base are positioned closer together when the extension member is positioned in the retracted position than when the extension member is positioned in the extended position. In an ideal illustrated embodiment, the extension member has an extended length defined between the ends of the extension member when the extension member is positioned in the extended position of about 18 inches.

Figure 2:
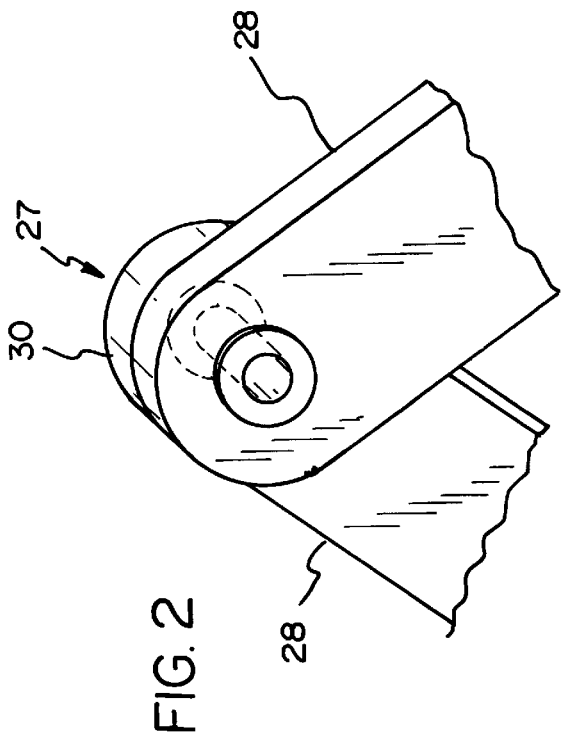
FIG. 2 is a schematic enlarged perspective view of a pivot coupling between adjacent elongate portions of an extension arm of the present invention taken from Circle 2 on FIG. 1.

The extension member has a pair of opposite ends. A first of the ends of the extension member is positioned adjacent the base. A second of the ends of the extended member is positioned adjacent the holding bracket. The extension member comprises a pair of crisscrossing extension arms 26,27. The extension arms each have a pair of opposite ends, a plurality of connected elongate portions 28. A first of the ends of each of the extension arms is positioned at the first end of the extension member and a second of the ends of each of the extension arms is positioned at the second end of the extension member. With particular reference to FIGS. 1 and 2, the first end of a first of the extension arms is pivotally coupled to the upper mounting arm of the front face of the base to permit pivoting of the first extension arm about a first pivot axis extending substantially parallel to the rear face of the base and the first end of a second of the extension arms is pivotally coupled to the lower mounting arm of the front face of the base to permit pivoting of the second extension arm about a second pivot axis extending substantially parallel to the rear face of the base. The first and second pivot axes are preferably substantially coaxial with each other.

As best illustrated in FIG. 5, the second ends of the extension arms are pivotally coupled together and also pivotally coupled to a generally D-shaped mounting tab 29 outwardly extending from the middle portion of the holding bracket. The second ends of the extension members are pivotally coupled to the mounting tab of the holding bracket to permit pivoting about a generally horizontal extending third pivot axis extending substantially perpendicular to the vertically extending first and second pivot axes. Optionally, a universal pivot joint may couple the mounting tab of the holding bracket to the second ends of the extension arms to permit pivoting of the holding bracket in both vertical and horizontal axes with respect to the extension member.

With reference to FIGS. 1 and 2, the elongate portions of each extension arm are arranged in a zigzag fashion between the ends of the respective extension arm to define a plurality of generally V-shaped alternating peak and valley vertices 30,31 with each pair of adjacent elongate portions of the respective extension portion forming therebetween one of the vertices of the respective extension arm. As illustrated in FIG. 2, each of the elongate portions of each extension arm is pivotally coupled to the adjacent associated elongate portions of the respective extension arm at the associated vertex formed therebetween. Each peak vertex of each extension arm is associated with a valley vertex of the other extension arm. Preferably, each pair of associated peak and valley vertices generally lie along a common line with the common lines of the pairs of associated peak and valley vertices being extended substantially parallel to one another and, ideally, substantially vertically as well. In use, the associated peak and valley vertices are positioned closer together when the extension member is positioned in the extended position than when the extension member is positioned in the retracted position.

Figure 3:
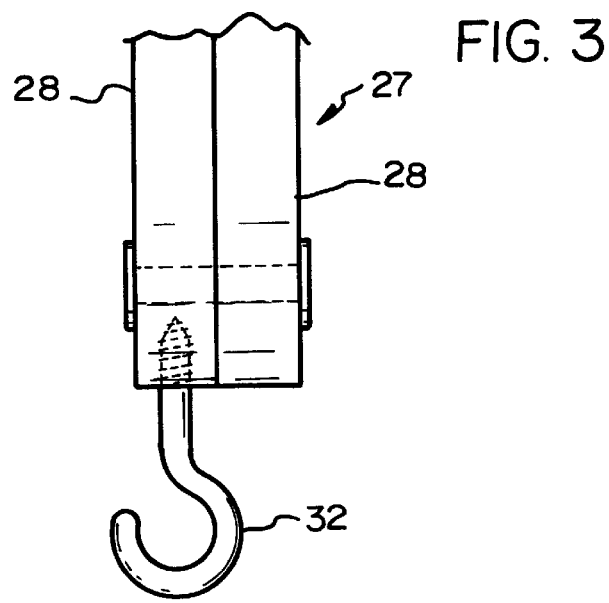
FIG. 3 is a schematic enlarged side view of a hook taken from Circle 3 on FIG. 1.
Figure 4:
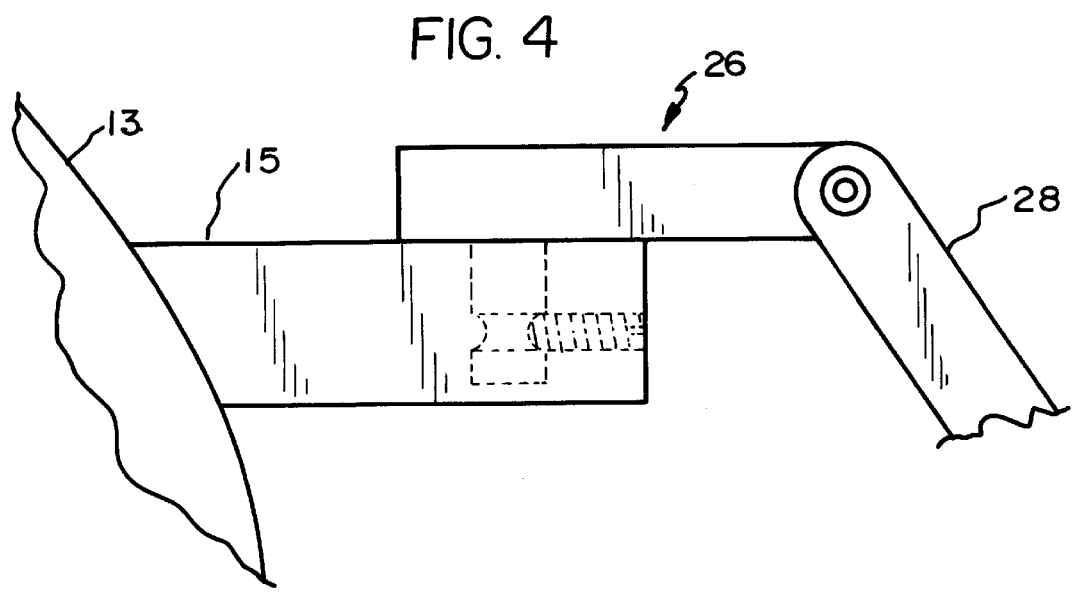
FIG. 4 is a schematic enlarged perspective view of a pivot coupling of one of the extension arms and the upper mounting arm of the present invention taken from Circle 4 on FIG. 1.

Preferably, each of the valley vertices of the extension arms has a J-shaped hook 32 downwardly depending therefrom as illustrated in FIGS. 1 and 3. In use, the hooks are designed for hanging the power cord 33 of the hair dryer thereon.

In use, the handle of a hair dryer is positioned in the space between the side portions of the holding bracket. The flexible power cord extending from the handle of the hair dryer is hung on the hooks so that the plug may be inserted into a receptacle provided in the front face of base that is electrically connected to a power supply by wires 35 extending from the rear face of the base.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for holding a hair dryer, comprising:
    a base having a rear face and a front face;
    said rear face of said base being adapted for mounting to a wall structure;
    a generally U-shaped holding bracket having a spaced apart pair of side portions and a middle portion connecting said side portions of said holding bracket together;
    said holding bracket having a generally U-shaped interior face defining a generally U-shaped space adapted for receiving a hair dryer therein;
    an adjustably extendable extension member connecting said base to said holding bracket;
    said extension member having an extended position and a retracted position;
    said holding bracket and said base being positioned closer together when said extension member is positioned in said retracted position than when said extension member is positioned in said extended position; and
    wherein each of said side portions of said holding bracket terminates at a free end distal said middle portion of said holding bracket, a flexible strap extending between said free ends of said side portions of said holding bracket to help hold the hair dryer between said side portions of said holding bracket.

2. The device of claim 1, wherein said rear face of said base has a spaced apart pair of key-hole shaped mounting holes therein, said mounting holes of said rear face being adapted for receiving mounting fasteners outwardly extending from the wall structure to mount said rear face of said base to the wall structure.

3. The device of claim 1, wherein said interior face of said holding bracket has a generally U-shaped resiliently deformable pad thereon, said pad being adapted for helping hold the hair dryer in said U-shaped spaced of said holding bracket.

4. The device of claim 1, wherein said flexible strap has a pair of opposite ends, one of said ends of said flexible strap being coupled to one of said side portions of said holding bracket, the other of said ends of said flexible strap being detachably attached to the other of said side portions of said holding bracket.

5. The device of claim 1, wherein said extension member has a pair of opposite ends, a first of said ends of said extension member being positioned adjacent said base, a second of said ends of said extended member being positioned adjacent said holding bracket, wherein said extension member comprises a pair of crisscrossing extension arms, said extension arms each having a pair of opposite ends, a plurality of connected elongate portions, wherein a first of said ends of each of said extension arms is positioned at said first end of said extension member, and wherein a second of said ends of each of said extension arms is positioned at said second end of said extension member.

6. The device of claim 5, wherein said front face of said base has spaced apart upper and lower mounting arms outwardly extending therefrom, wherein said first end of a first of said extension arms is pivotally coupled to said upper mounting arm of said front face of said base, wherein said first end of a second of said extension arms is pivotally coupled to said lower mounting arm of said front face of said base.

7. The device of claim 6, wherein said holding bracket has a mounting tab outwardly extending therefrom, said second end of said extension members being pivotally coupled to said mounting tab of said holding bracket.

8. The device of claim 5, wherein said elongate portions of each extension arm are arranged in a zigzag fashion between said ends of the respective extension arm to define a plurality of generally V-shaped alternating peak and valley vertices, each pair of adjacent elongate portions of the respective extension portion forming therebetween one of said vertices of the respective extension arm, each of said elongate portions of each extension arm being pivotally coupled to the adjacent associated elongate portions of the respective extension arm at the associated vertex formed therebetween.

9. The device of claim 8, wherein each peak vertex of each extension arm is associated with a valley vertex of the other extension arm, each pair of associated peak and valley vertices generally lying along a common line, said common lines of said pairs of associated peak and valley vertices being extended substantially parallel to one another.

10. The device of claim 8, wherein each of said valley vertices of said extension arms has a J-shaped hook downwardly depending therefrom.

11. A hair dryer holder system, comprising:

a generally hemispherical base having a substantially planar and generally circular rear face and a rounded front face, said front face of said base having a convexity facing outwardly away from said rear face of said base;

said rear face of said base being adapted for mounting to a wall structure, said rear face of said base having a generally circular outer periphery and a spaced apart pair of key-hole shaped mounting holes therein;

said mounting holes of said rear face being positioned adjacent said outer periphery of said rear face at generally diametric positions along said outer periphery of said rear face;

said mounting holes of said rear face being adapted for receiving mounting fasteners outwardly extending from the wall structure to mount said rear face of said base to the wall structure;

said front face of said base having spaced apart upper and lower mounting arms outwardly extending therefrom, said mounting arms of said front face each having a length defined outwardly from said front face of said base, said lengths of said mounting arms being substantially equal to one another;

a generally U-shaped holding bracket having a spaced apart pair of generally straight resiliently deflectable side portions and an arcuate middle portion connecting said side portions of said holding bracket together;

said holding bracket having a generally U-shaped interior face defining a generally U-shaped space adapted for receiving a hair dryer therein;

said interior face of said holding bracket having a generally U-shaped resiliently deformable pad thereon, said pad being adapted for helping hold the hair dryer in said U-shaped spaced of said holding bracket;

each of said side portions of said holding bracket terminating at a free end distal said middle portion of said holding bracket;

a flexible strap extending between said free ends of said side portions of said holding bracket to help hold the hair dryer between said side portions of said holding bracket;

said flexible strap having a pair of opposite ends, one of said ends of said flexible strap being coupled to one of said side portions of said holding bracket, the other of said ends of said flexible strap being detachably attached to the other of said side portions of said holding bracket;

an adjustably extendable extension member connecting said base to said holding bracket;

said extension member having an extended position and a retracted position;

said holding bracket and said base being positioned closer together when said extension member is positioned in said retracted position than when said extension member is positioned in said extended position;

said extension member having a pair of opposite ends, a first of said ends of said extension member being positioned adjacent said base, a second of said ends of said extended member being positioned adjacent said holding bracket;

said extension member comprising a pair of crisscrossing extension arms, said extension arms each having a pair of opposite ends, a plurality of connected elongate portions;

a first of said ends of each of said extension arms being positioned at said first end of said extension member, a second of said ends of each of said extension arms being positioned at said second end of said extension member;

said first end of a first of said extension arms being pivotally coupled to said upper mounting arm of said front face of said base to permit pivoting of said first extension arm about a first pivot axis extending substantially parallel to said rear face of said base;

said first end of a second of said extension arms being pivotally coupled to said lower mounting arm of said front face of said base to permit pivoting of said second extension arm about a second pivot axis extending substantially parallel to said rear face of said base;

said first and second pivot axes being substantially coaxial with each other;

said second ends of said extension arms being pivotally coupled together;

said holding bracket having a generally D-shaped mounting tab outwardly extending from said middle portion of said holding bracket, said second end of said extension members being pivotally coupled to said mounting tab of said holding bracket to permit pivoting about a third pivot axis extending substantially perpendicular to said first and second pivot axes said elongate portions of each extension arm being arranged in a zigzag fashion between said ends of the respective extension arm to define a plurality of generally V-shaped alternating peak and valley vertices, each pair of adjacent elongate portions of the respective extension portion forming therebetween one of said vertices of the respective extension arm;

each of said elongate portions of each extension arm being pivotally coupled to the adjacent associated elongate portions of the respective extension arm at the associated vertex formed therebetween;

each peak vertex of each extension arm being associated with a valley vertex of the other extension arm;

each pair of associated peak and valley vertices generally lying along a common line, said common lines of said pairs of associated peak and valley vertices being extended substantially parallel to one another;

each of said valley vertices of said extension arms having a J-shaped hook downwardly depending therefrom;

a hair dryer having a handle positioned in said space between said side portions of said holding bracket;

the hair dryer having a flexible power cord extending from the handle of the hair dryer, the power cord being hung on said hooks, the flexible power cord terminating at a plug; and the plug being inserted into a receptacle provided in said front face of base electrically connected to a power supply.

12. A device for holding a hair dryer, comprising:

a base having a rear face and a front face;

said rear face of said base being adapted for mounting to a wall structure;

a generally U-shaped holding bracket having a spaced apart pair of side portions and a middle portion connecting said side portions of said holding bracket together;

said holding bracket having a generally U-shaped interior face defining a generally U-shaped space adapted for receiving a hair dryer therein;

an adjustably extendable extension member connecting said base to said holding bracket;

said extension member having an extended position and a retracted position;

said holding bracket and said base being positioned closer together when said extension member is positioned in said retracted position than when said extension member is positioned in said extended position;

wherein said extension member has a pair of opposite ends, a first of said ends of said extension member being positioned adjacent said base, a second of said ends of said extended member being positioned adjacent said holding bracket, wherein said extension member comprises a pair of crisscrossing extension arms, said extension arms each having a pair of opposite ends, a plurality of connected elongate portions, wherein a first of said ends of each of said extension arms is positioned at said first end of said extension member, and wherein a second of said ends of each of said extension arms is positioned at said second end of said extension member; and wherein said front face of said base has spaced apart upper and lower mounting arms outwardly extending therefrom, wherein said first end of a first of said extension arms is pivotally coupled to said upper mounting arm of said front face of said base, wherein said first end of a second of said extension arms is pivotally coupled to said lower mounting arm of said front face of said base.

\* \* \* \* \*